(12) United States Patent
Stevens

(10) Patent No.: US 12,699,261 B2
(45) Date of Patent: Aug. 4, 2026

(54) OPTICAL SCANNING SYSTEM AND METHOD

(71) Applicant: Stevens CAD/CAM, LLC, Bellefonte, PA (US)

(72) Inventor: Michael John Stevens, Boalsburg, PA (US)

(73) Assignee: Stevens CAD/CAM, LLC, Bellefonte, PA (US)

( * ) Notice: Subject to any disclaimer, the term of this patent is extended or adjusted under 35 U.S.C. 154(b) by 399 days.

(21) Appl. No.: 18/467,579

(22) Filed: Sep. 14, 2023

(65) Prior Publication Data

US 2024/0094521 A1 Mar. 21, 2024

Related U.S. Application Data

(60) Provisional application No. 63/419,988, filed on Oct. 27, 2022, provisional application No. 63/407,056, filed on Sep. 15, 2022.

(51) Int. Cl.
| | |
|---|---|
| *G02B 23/24* | (2006.01) |
| *G02B 26/08* | (2006.01) |
| *G02B 26/10* | (2006.01) |

(52) U.S. Cl.
CPC ....... *G02B 23/243* (2013.01); *G02B 23/2469* (2013.01); *G02B 26/0816* (2013.01); *G02B 26/101* (2013.01)

(58) Field of Classification Search
CPC .............. G02B 23/243; G02B 23/2469; G02B 26/0816; G02B 26/101

(Continued)

(56) References Cited

U.S. PATENT DOCUMENTS

2003/0039428 A1* 2/2003 Okamoto ............... G01D 5/266
356/477
2003/0190673 A1* 10/2003 Nikitin ................... G01N 21/45
435/7.1

(Continued)

OTHER PUBLICATIONS

Novacam, Boreinspect TM System for 3D Bore Measurement, Novacam Technologies, Inc., Copyright 2021, Accessed Oct. 28, 2022 at https://www.novacam.com/products/boreinspect-for-3d-bore-metrology/, 7 pps.

*Primary Examiner* — Stephone B Allen
*Assistant Examiner* — Boutsikaris Leonidas
(74) *Attorney, Agent, or Firm* — Foley & Lardner LLP

(57) ABSTRACT

An optical scanning system and method are provided that may include an optical scanning attachment coupled to a digitizing arm for use in a three-dimensional (3D) scan of a surface of a partially closed volume. The optical scanning attachment including at least one laser operable to generate a laser light at a frequency. The optical scanning attachment further includes at least one optical element operable to receive the laser light and create a light pattern. The optical scanning attachment further includes at least one camera including a lens and configured to receive an image of the light pattern on the surface of the partially closed volume. The optical scanning attachment further includes an elongated member having a proximal and a distal end, wherein the proximal end is positioned closer to the digitizing arm as compared to the distal end, wherein the at least one laser is positioned so that external laser light emanates adjacent the distal end of the elongated member.

17 Claims, 22 Drawing Sheets

(58) Field of Classification Search
USPC ...................................................... 359/201.1
See application file for complete search history.

(56)                          References Cited

U.S. PATENT DOCUMENTS

2008/0259346  A1*   10/2008   Strahle ............... G01B 11/2441
                                                               356/496
2011/0164108  A1*    7/2011   Bates ..................... G02B 13/06
                                                               348/36
2021/0373316  A1*   12/2021   Desai ................... A61B 1/0684

* cited by examiner

100

1

2

7

8

3

9

6

5

100

1

2

7

8

9

3

4

5

6

100

800 ⌐

1000

1000

1400

1500

1500

1500

2200

2210
Generate a laser light at a frequency

2220
Receive the laser light

2230
Create a light pattern

2240
Receive an image of the light pattern on the surface

OPTICAL SCANNING SYSTEM AND METHOD

CROSS-REFERENCE TO RELATED APPLICATIONS AND CLAIM OF PRIORITY

This application claims the benefit of, and priority to (1) U.S. Provisional Application No. 63/419,986, filed Oct. 27, 2022, and (2) U.S. Provisional Application No. 63/407,056, filed Sep. 15, 2022, each of which are incorporated by reference herein in their entireties for all purposes.

BACKGROUND

The present disclosure relates generally to the field of model generations using digitizers or scanners. A digitizer or scanner can generate models based on attachments used to capture and receive content of the surfaces of volumes.

SUMMARY

Some embodiments relate to an optical scanning attachment for an optical scanning system and method. The optical scanning attachment may be coupled to a digitizing arm for use in a three-dimensional (3D) scan of a surface of a partially closed volume. The optical scanning attachment includes at least one laser operable to generate a laser light at a frequency. The optical scanning attachment further includes at least one optical element operable to receive the laser light and create a light pattern, wherein the at least one optical element is configured to provide the light pattern on the surface of the partially closed volume. The optical scanning attachment further includes at least one camera including a lens and configured to receive an image of the light pattern on the surface of the partially closed volume. The optical scanning attachment further includes an elongated member having a proximal and a distal end, wherein the proximal end is positioned closer to the digitizing arm as compared to the distal end, wherein the at least one laser is positioned so that external laser light emanates adjacent the distal end of the elongated member.

In some embodiments, the at least one camera is positioned adjacent to the distal end, and wherein the image of the light pattern on the surface of the partially closed volume includes surface contours. In various embodiments, at least a portion of the lens is positioned outside the elongated member. In some embodiments, the portion of the lens positioned outside the elongated member is co-planar to the elongated member. In various embodiments, the portion of the lens positioned outside the elongated member is non-planar to the elongated member. In some embodiments, at least a portion of the at least one optical element is positioned outside the elongated member. In various embodiments, the image of the light pattern on the surface of the partially closed volume is transmitted, via a fiber optic cable, to the digitizing arm for processing, and wherein the light pattern is conical or flat. In some embodiments, the lens is at least one of a fisheye lens or a wide angle lens, and wherein the at least one optical element is at least of a conical mirror or prism. In various embodiments, the optical scanning attachment further includes an interface positioned at the proximal end and configured to fixedly couple to the digitizing arm. In some embodiments, the laser light is generated by a plurality of lasers, wherein the laser light is aggregate of the plurality of lasers. In various embodiments, the at least one camera includes at least one of a plurality of cameras or a plurality of lenses. In some embodiments, the plurality of cameras includes at least four cameras each configured to receive a different image of the light pattern on the surface of the partially closed volume. In various embodiments, the light pattern on the surface of the partially closed volume is a conical projection, wherein accuracy of the at least one camera is based on at least one or more of attributes selected from the group consisting of a megapixel size of the at least one camera, a size of a camera field of view of the at least one camera, an aspect ratio of the at least one camera, a rated accuracy of the at least one camera, a camera field of view to corners of the at least one camera, an arm tolerance of the digitizing arm, and a type of the at least one camera. In some embodiments, the optical scanning attachment further includes a contact sphere fixedly coupled to the distal end of the elongated member. In various embodiments, the at least one optical element is a flat mirror and wherein the lens is a line lens. In some embodiments, the at least one camera is positioned off-axis to the distal end, wherein the partially closed volume is at least one of a casting with a core, a welded sheet metal part or assembly, a riveted assembly, a composite structure, or a tube structure.

Some embodiments relate to a method for scanning a surface of a partially closed volume, the method including generating, by at least one laser of an optical scanning attachment, a laser light at a frequency. The method further includes receiving, by at least one optical element of the optical scanning attachment, the laser light. The method further includes creating, by the at least one optical element, a light pattern. The method further includes receiving, by at least one camera of the optical scanning attachment, an image of the light pattern on the surface of the partially closed volume, wherein the optical scanning attachment includes an elongated member having a proximal and a distal end, wherein the proximal end is positioned closer to a digitizing arm as compared to the distal end, wherein the at least one laser is positioned so that external laser light emanates adjacent the distal end of the elongated member.

Some embodiments relate to an optical scanning system including a digitizing arm including a processing circuit for processing images, a digitizing arm interface fixedly coupled to the digitizing arm, an optical attachment coupled, via the digitizing arm interface, to the digitizing arm for use in a three-dimensional (3D) scan of a surface of a partially closed volume, the optical scanning attachment including at least one laser operable to generate a laser light at a frequency, at least one optical element operable to receive the laser light and create a light pattern, wherein the at least one optical element is configured to provide the light pattern on the surface of the partially closed volume, at least one camera including a lens and configured to receive an image of the light pattern on the surface of the partially closed volume. The optical scanning system further including an elongated member having a proximal and a distal end, wherein the proximal end is positioned closer to the digitizing arm as compared to the distal end, wherein the at least one laser is positioned so that external laser light emanates adjacent the distal end of the elongated member.

In some embodiments, the at least one camera is positioned adjacent to the distal end, and wherein the image of the light pattern on the surface of the partially closed volume includes surface contours, wherein the portion of the lens positioned outside the elongated member is co-planar to the elongated member. In various embodiments, at least a portion of the at least one optical element is positioned outside the elongated member, and wherein the image of the light pattern on the surface of the partially closed volume is transmitted, via a fiber optic cable, to the digitizing arm for processing, and wherein the light pattern is conical or flat.

Figure 1:
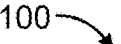
FIG. 1 is a perspective view of an optical scanning attachment, according to some embodiments.

It will be recognized that some or all of the FIGURES are schematic representations for purposes of illustration. The FIGURES are provided for the purpose of illustrating one or more embodiments with the explicit understanding that they will not be used to limit the scope or the meaning of the claims. Like elements are indicated with like references.

DETAILED DESCRIPTION

Before turning to the FIGURES, which illustrate the exemplary embodiments in detail, it should be understood that the disclosure is not limited to the details or methodology set forth in the description or illustrated in the FIGURES. It should also be understood that the terminology is for the purpose of description only and should not be regarded as limiting.

Referring to the FIGURES generally, various embodiments disclosed herein relate to an optical scanning attachment 100 configured to fixedly couple (or attach) to a digitizing arm (e.g., coordinate-measuring machine (CMM)). In some embodiments, the optical scanning attachment 100 can include a laser, an optical element, a camera, and an elongated member. The optical scanning attachment 100 can be used to three-dimensionally scan surfaces of a volume based on a camera receiving (or capturing) an image of a laser pattern provided by the optical element based on receiving a laser light from the laser. In particular, the optical scanning attachment 100 can be configured to transmit images of laser patterns on the surfaces of volumes to a processing circuit of a digitizing arm for processing. The digitizing arm can have a plurality of articulating axes and can be configured to track the optical scanning attachment 100 into three-dimensional (3D) space. In various embodiments, the optical scanning attachment 100 is configured to scan surfaces of a partially closed volume. In general, the images of laser patterns can be collected by the digitizing arm and aggregated to calculate both contact and non-contact measurements (e.g., geometry) of a volume (e.g., physical objects) based on the surface counter of the surface.

The digitizer (or coordinate measuring machine, CMM) using image processing, can generate a set of 2D coordinates that describe the location of the laser line in the camera image. The set of 2D coordinates can be transformed into 3D coordinates using the instantaneous location and direction vector of the CMM end (e.g., in particular, the end of stem 2). This process, taking an image, finding the 2D coordinates of the laser line (e.g., laser pattern 6) and transforming those coordinates to 3D coordinates using the instantaneous position of the optical scanning attachment 100. This can happen hundreds to thousands of times per second, and results in a point cloud. The optical scanning attachment 100 described herein provide improvement to scanning functionality that can enable scanning of small cavities and offering a 360 degree scanning envelope.

In some embodiments, the versatility of the optical scanning attachment 100 provides improvements over traditional applications. While many scanning systems are confined by limitations of scale or shape, this particular design excels in a wide range of environments. Specifically, the inclusion of an optical element, laser, and camera in the attachment allows for capturing intricate details inside smaller cavities, which would be challenging for conventional scanning methods. Furthermore, its 360-degree scanning envelope ensures comprehensive coverage of any object, irrespective of its geometric complexity. Such flexibility ensures that industries, from precision engineering to heritage conservation, can benefit from its unique capabilities. This approach combines high-speed data acquisition with unparalleled precision, offering a robust solution for contemporary 3D scanning challenges.

Referring now to FIG. 1, a perspective view of an optical scanning attachment 100 is depicted, according to some embodiments. The optical scanning attachment 100 is shown to include a CMM interface 1, a stem 2, a laser diode 3 (hidden), a conical mirror 5, a laser pattern 6, a digital camera 7 (hidden), a wide angle lens 8, and camera field of view (FOV) 9. In various embodiments, optical scanning attachment 100 can include fewer, additional, or alternative elements, devices, and systems described herein.

Figure 19:
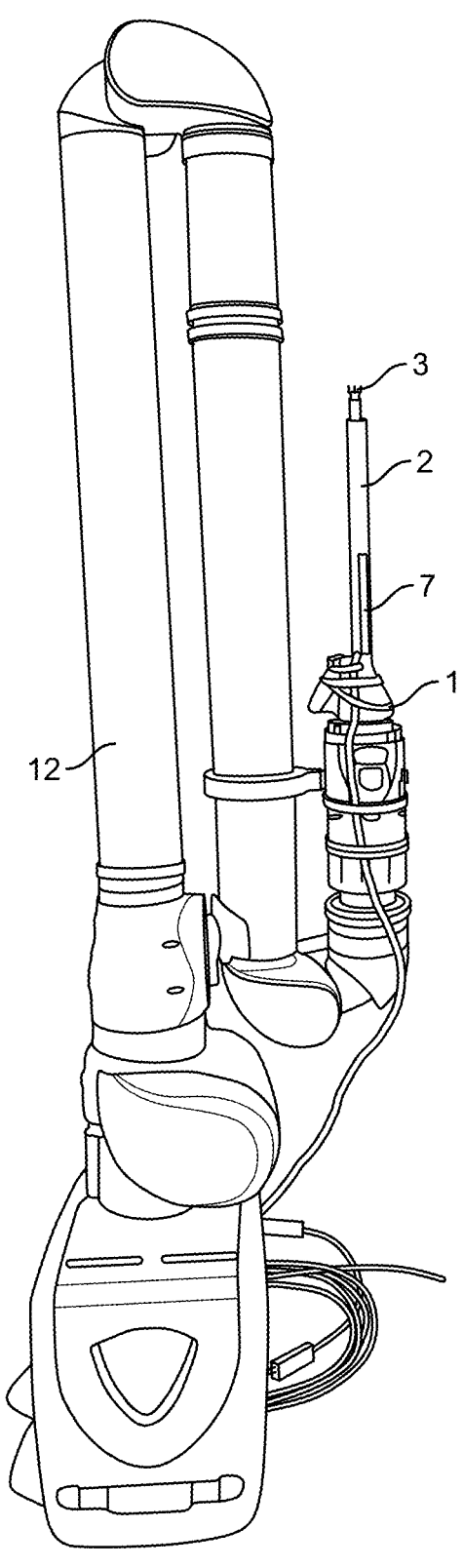
FIGS. 19-21 depict an example implementation of an optical scanning attachment of FIG. 1 within an environment, according to some embodiments.

In some embodiments, the CMM interface 1 can be configured to couple (e.g., attach, lock, connect) an interface of the digitizing arm (with reference to "digitizer 12" of FIG. 19). The coupling can include fixedly coupling, electrically coupling, and/or communicably coupled. For example, the CMM interface 1 can be fixedly coupled to an interface of a digitizing arm to enable movement of the optical scanning attachment 100 including movement of the digitizing arm. In another example, the CMM interface 1 can be electrically coupled to a power source of the digitizing arm to enable the optical scanning attachment 100 to be powered. In yet another example, the CMM interface 1 can be communicably coupled to a processing circuit of the digitizing arm to enable the optical scanning attachment 100 to collect, receive, and transmit data to and from the processing circuit of the digitizing arm.

In some embodiments, the stem 2 can be an elongated member including a proximal and distal end. As referred to throughout, the proximal end can be the end positioned closest to the digitizing arm and the distal end can be the end positioned closest to the optical elements (e.g., conical mirror 5). Stem 2 can contain cables and wires for communicably coupling the optical scanning attachment to the digitizing arm. Stem 2 can be made of various elements such as, but not limited to, plastic, metal, or any synthetic material. In various embodiments, stem 2 can be various lengths (e.g., 1-100 cm, 0.5-12 inches, 1-5 feet, etc.) depending on the application. In some embodiments, stem 2 can have various radiuses (e.g., 0.5-15 mm, 1.5 cm-10 cm, etc.) depending on the application. For example, stem 2 can be long and narrow to enable the optical scanning attachment 100 to fit into small cavities or tubes of a volume (e.g., partially closed volume). While stem 2 is shown as being co-planar (along an axis) to the digitizing arms interface (e.g., where CMM interface 1 fixedly couples to the digitizing arm), it should be understood that stem 2 can be curved or non-planar (off-axis) to the digitizing arms interface (e.g., bent such as, but not limited to, 15 degree angle off-axis, 45 degree angle off-axis, or curved with a radial curvature, etc.)

In some embodiments, the laser diode 3 (not shown, generally referred to herein as "a laser") can be positioned within the stem 2 (sometimes referred to herein as "an elongated member") or outside and at the distal end of the stem 2. The laser diode 3 can be coaxial with stem 2, offset from stem 2, and/or at an angle (e.g., 1-60 degrees) of stem 2. Laser diode 3 can be electrically coupled to the digitizing arm via a cable (e.g., to receive electrical current) that provides power to laser diode 3. In some embodiments, laser diode 3 can be powered using a battery (e.g., stored within stem 2). Laser diode 3 can be operable to generate a laser light at a frequency and/or wavelength. For example, the laser diode 3 can be, but is not limited to, a UV laser diode, a near infrared (NIR) laser diode, a mid-infrared (MIR) Quantum cascade laser, a visible laser diode, etc. The laser light can be provided to at least one optical element, such as conical mirror 5.

In some embodiments, the conical mirror 5 (generally referred to herein as "an optical element") can be positioned outside and at the distal end of stem 2. The conical mirror 5 can be operable to receive the laser light from laser diode 3 and create (e.g., by reflecting or refracting the laser light) a laser pattern 6 (e.g., planar fan shape, conical shape, etc.) (sometime referred to herein as "a light pattern"). The created (or projected) laser pattern 6 can be coaxial to stem 2, offset from stem 2, and/or at same angle of stem 2. As shown with reference to FIGS. 5 and 25-27, laser pattern 6 can be projected (based on reflecting or retracting the laser light by conical mirror 5) onto a surface (or volume) and can illuminate the surface of the object to be digitized. In some embodiments, the laser pattern emanates adjacent the distal end of stem 2. While conical mirror 5 is shown as a conical mirror, it should be understood that it could be a different type of mirror (e.g., flat, curved, fixed, moving, etc.), prism, or can instead be a lens (e.g., focusing, fac, axion, etc.) depending on the application (e.g., volume or surface contour being scanned).

In some embodiments, the digital camera 7 (not shown, generally referred to herein as "a camera") can be positioned and/or mounted within the stem 2 (sometimes referred to herein as "an elongated member") or outside and at the distal end of the stem 2. As shown, the digital camera 7 is adjacent to the distal end of the stem 2. The digital camera 7 can include a wide angle lens 8 (co-planar to the stem 2) that can capture the cameras field of view (FOV) 9. Digital camera 7 can be electrically coupled to the digitizing arm via a cable (e.g., to receive electrical current) that provides power to digital camera 7. In some embodiments, digital camera 7 can be powered using a battery (e.g., stored within stem 2). In various embodiments, the digital camera 7 can also be communicably coupled to the digitizing arm via a wired (e.g., fiber optic cable, coaxial cable, ethernet cable) or wireless connection (e.g., Wi-Fi, Bluetooth). Digital camera 7 can be configured to receive an image of the laser pattern 6 on the surface of a volume. In some embodiments, the surface can be a partially closed volume. In particular, the digital camera 7 can be configured to receive and transmit images from captured through the wide angle lens 8 to the processing circuit of the digitizing arm for analysis and/or processing. As used herein, "partially closed volume" refers to a group of surfaces that are connected together to form a polyhedron, cylinder, cone, or sphere that contains at least one free edge or opening to enable the optical scanning attachment 100 to enter and scan the interior surface contour of the polyhedron, cylinder, cone, or sphere. The images (laser pattern 6 projected on the surface of the volume) can be collected, captured, or received based on the camera FOV 9. In some embodiments, digital camera 7 can be, but is not limited to, a fiber optic camera, a fiberscope, a borescope, endoscope, otoscope, inspection camera, etc.

In various embodiments, digital camera 7 can be mounted at the aperture of the wide angle lens 8 or can be mounted elsewhere within the stem 2 or in the digitizing arm such that the wide angle lens 8 can be connected to the digital camera 7 via a wired or wireless connection (e.g., Wi-Fi, Bluetooth, optical fiber, ethernet cable, etc.). As shown, the aperture can be positioned (e.g., mounted) outside and at the distal end of the stem 2. In some embodiments, the camera FOV 9 is determined based on one or more optical elements. For example, the optical scanning attachment 100 is shown to include a wide angle lens (i.e., optical element), which determines the camera FOV 9. It should be understood that the optical element coupled to the digital camera 7 can be, but is not limited, a wide angle lens (e.g., wide angle, ultra-wide, fisheye), a narrow lens, and/or mirrors (e.g., flat, curved, or conical), and where the lens can have different focal lengths, spot sizes, and depths of focus. In some embodiments, the wide angle lens 8 can be electrically coupled to the digital camera 7 to enable the digital camera 7 to send commands to adjust (e.g., refocus, recalibrate) the wide angle lens 8 (e.g., in real-time as the optical scanning attachment 100 is digitizing the surface of a volume).

For example, digital camera 7 can be a borescope camera including, but not limited to, a lens, image sensor, and supporting electronics and computing component (e.g., IO interface, processing circuit, USB or IO ports). In another example, the digital camera 7 can be an integrated camera module (e.g., used in the manufacturing of smartphones) including, but not limited to, a lens, image sensor, and supporting electronics and computing components (e.g., IO interface, processing circuit, USB or IO ports). In yet another example, the digital camera 7 can be an image sensor (sometimes referred to as a "custom integrated camera module") preceded by one or more lenses and other optical elements, and can be soldered to and supported by electronics and computing components that provide an IO interface to a processing circuit for processing the image data into a point cloud.

Accordingly, in general, the optical scanning attachment 100, as detailed in FIG. 1, provides an assembly consisting of a CMM interface 1, a stem 2, a laser diode 3, a conical mirror 5, a laser pattern 6, a digital camera 7, a wide angle lens 8, and a camera's field of view 9. The CMM interface 1 can establish connections to the digitizing arm, serving as the bridge for both physical and data transmissions. The stem 2, which might vary in dimensions based on its application, houses various components and provides the structural support for the optical scanning attachment. Within or adjacent to this stem lies the laser diode 3, responsible for generating laser light, and the conical mirror 5, which projects a unique laser pattern onto the subject. The digital camera 7, equipped with a wide angle lens 8, captures this laser pattern, facilitating the digitization of the target object. The arrangement ensures that the device can capture detailed 3D scans, even within partially closed volumes, revolutionizing potential applications in diverse fields.

In view of the aforementioned features, one advantage of the optical scanning attachment 100 is its proficiency in scanning partially closed volumes. Given the inherent challenges in capturing detailed data from areas with restricted access, traditional methods often fall short. However, the optical scanning attachment 100's design, especially the elongated stem 2, how it is attachable, and its compatibility with various lens types, allows for precise scanning within small cavities or tubes. The conical mirror 5 and laser pattern 6 ensure consistent illumination within these confined spaces, guaranteeing accurate capture of intricate details. Moreover, the digital camera 7's field of view, enhanced by the wide angle lens 8, maximizes the scanning envelope, capturing a comprehensive image of the interior contours. This capability not only broadens the scope of applications—from industrial inspections to medical diagnostics—but also ensures that the scans are both detailed and accurate, minimizing the need for repeated measurements or invasive procedures. Furthermore, as an attachment, the optical scanning system 100 introduces an improved level of versatility and adaptability to existing digitizing arms, eliminating the need for purchasing entirely new equipment. This modular approach not only offers cost savings but also streamlines the integration process, allowing users to effortlessly switch between scanning capabilities based on their specific requirements.

In some embodiments, a 3D model can be created based on processing the image data into a point cloud. In particular, a point cloud can be set of data points in a space (e.g., such as a cavity or partial closed volume) which depicts the internal surfaces of objects. In some example embodiments, the point cloud may be converted into a 3D model. For example, the point cloud may be converted into a polygon mesh model, a triangle mesh model, a non-uniform rational basis spline (NURBS) surface model, or a CAD model through one or more surface reconstruction techniques.

Additionally, referring to the partially closed volume or cavity in more detail. For example, the partially closed volume can be a casting with a core (e.g., to create a follow section or cavity in a casting) such as, but not limited to, a horizontal core, vertical core, balance core, hanging core, drop core, kiss core, etc. In the following example, the casting could be a cast iron teapot (i.e., the object) that can be internally digitized by the optical scanning attachment 100. It should be understood that internally digitizing can also include digitizing external portions or the entire object using the optical scanning attachment 100.

In another example, the partially closed volume or cavity can be a welded sheet metal part or assembly such as, but not limited to, HVAC equipment, movable objects parts and bodies (e.g., car door, truck undercarriage, earth mover gas tank, airplane fuselages and wings, etc.), appliances, tin cylinders or cans, roofing for buildings, etc. In the following example, the welded sheet metal part can be a truck door that can be internally digitized by the optical scanning attachment 100.

In yet another example, the partially closed volume or cavity can be a riveted assembly such as, but not limited to, aircrafts, jewelry, joints, buildings, etc. In the following example, the riveted assembly can be an airplane wing that can be internally digitized by the optical scanning attachment 100.

In yet another example, the partially closed volume or cavity can be a composite structure used or created in, but not limited to, aerospace manufacturing (e.g., wings, body, engine), automotive manufacturing (e.g., headlamp housing, electrical and heat shielded components, frames for windows and sunroofs, bumper), renewable energy manufacturing (e.g., wind turbine wings, solar panels), energy storage manufacturing (e.g., multifunctional energy storage composites (MESC)), marine manufacturing (e.g., boats, yachts), pipe and tank manufacturing (e.g., ductwork, tank liners, storage tanks, valves), sports and recreation manufacturing (e.g., bike frames, kayaks), etc., and where the composite can be, but is not limited to, fiberglass, carbon laminate composite, carbon sandwich composition, fiber laminate, glass-fiber composite (GRP), etc. In the following example, the composite structure can be a bicycle frame that can be internally digitized by the optical scanning attachment 100. Additionally, a disadvantage of composite structures, particularly when used in aircraft, is that damage may not be apparent from the exterior of the structure. For example, a small ding on the outside could indicate a larger failure on the inside. Thus, if a small hole was added to the design of the composite structure, the inside of the area could be scanned using the optical scanning attachment 100 to directly measure a damaged area.

In yet another example, the partially closed volume or cavity can be a tube structure such as, but not limited to, a framed tube, trussed tube, bundled tube, framed tube-intube, trussed tube-in-tube, framed tube, hat and belt trusses. In the following example, the tube structure can be a framed tube of a building that can be internally and/or externally digitized by the optical scanning attachment 100. Accordingly, in each of the partially closed volume examples described above, the optical scanning attachment 100 can project a light pattern on the surface of the partially closed volume.

It should be understood that the accuracy (or tolerance) and resolution of the optical scanning attachment 100 can be based on a desired or required standard, such as the ISO 10360-8 Annex D, as well as the various features and functionality of optical scanning attachment 100. In particular, the accuracy can be based on, but not limited to, the type of digital camera 7 used (e.g., integrated camera module such as a borescope, wide camera module, tele camera module-vertical, ultrawide camera module, or any other camera module including optics designed for particular applications with precision and field of view), the megapixels (MP) of digital camera 7 (e.g., 12 MP (or 12 million pixels), 16 MP, 50 MP), the size of the camera field of view 9 (e.g., 8 mm (width)×6 mm (height), 35 mm (width)×20 (height), 100 mm (width)×75 mm (height), 200 mm (width)×150 mm (height), 500 mm (width)×350 mm (height)), the aspect ratio of digital camera 7 (e.g., 3:2, 4:3, 4:5, 16:9), rated accuracy+/−1 pixel (e.g., 0.007 mm, 0.0125 mm, 0.025 mm, 0.05 mm, 0.125 mm), the camera field of view 9 to corners (e.g., 78.52365 mm, 102.68038 mm, 136.39718 mm), and/or edge arm tolerance (e.g., 0.029 mm).

The optical scanning attachment 100 has been engineered to address the needs of a broad array of industries and applications, from intricate aerospace components to detailed jewelry. By transitioning point clouds into 3D models, it offers an in-depth visualization of a scanned object's interior. These detailed models, be they polygon meshes, CAD models, or NURBS surface models, are invaluable in applications such as inspections, reverse engineering, and design verification.

Consistent accuracy is important when transitioning between diverse scanning environments and materials. Different structures present unique challenges: the intricacies of an aerospace composite might necessitate pinpoint accuracy to detect internal damage, whereas an HVAC system might demand a more general overview. The optical scanning attachment 100 accommodates these differences with its customizable camera features. Attributes like field of view, megapixels, and aspect ratio can be adjusted to suit the project, ensuring the acquired data meets the specific accuracy demands of each application.

While many industries adhere to the ISO 10360-8 Annex D standard to guarantee reliable measurements, alternatives like the American National Standards Institute (ANSI) standards, or the German Institute for Standardization (DIN) standards, can also be used depending on regional preferences or specific industry requirements. By being adaptable and compatible with multiple standards, the optical scanning attachment 100 ensures its utility across global industries and markets, delivering trustworthy and replicable data outputs.

Figure 2:
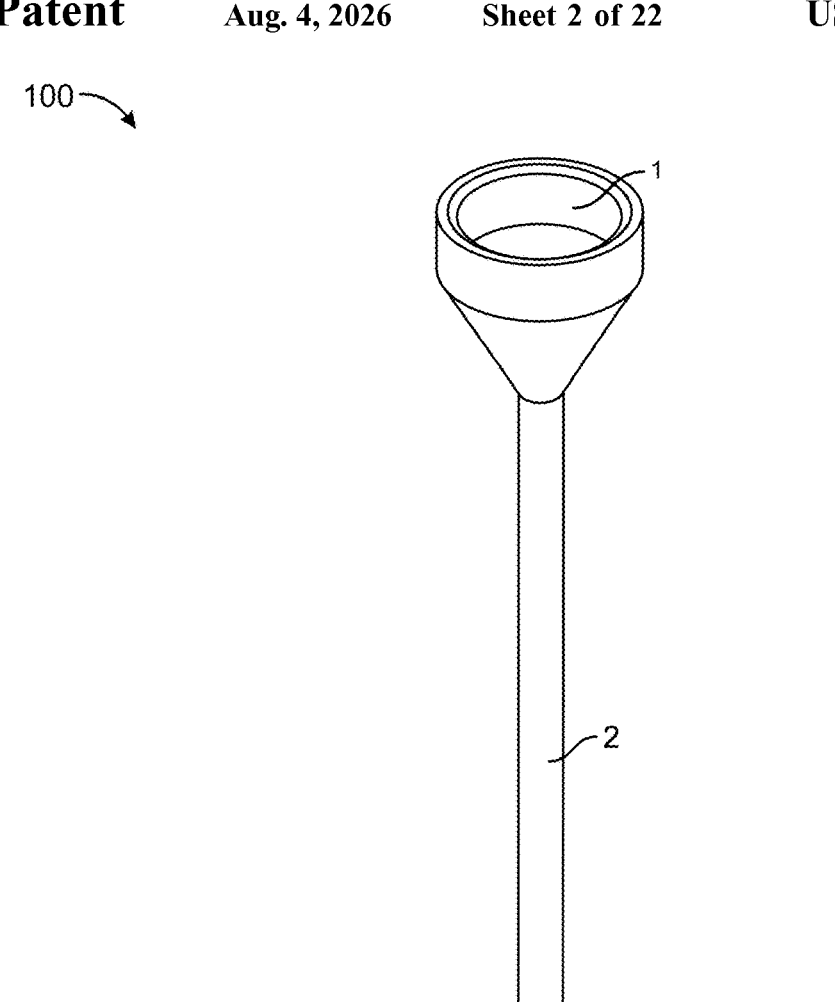
FIG. 2 is an isometric perspective view of an optical scanning attachment of FIG. 1, according to some embodiments.

Referring now to FIG. 2, an isometric perspective view of an optical scanning attachment 100 of FIG. 1 is depicted, according to some embodiments. As shown, the camera FOV 9 can be an area on the surface of a volume and the laser pattern 6 can be projected (shown as circular pattern based on the conical mirror 5) on the surface of the volume.

Figure 3:
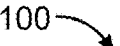
FIG. 3 is a section view of an optical scanning attachment of FIG. 1, according to some embodiments.
Figure 4:
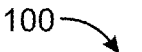
FIG. 4 is a section view of an optical scanning attachment of FIG. 1, according to some embodiments.
Figure 4:
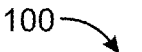

Referring now to FIGS. 3-4, section views of an optical scanning attachment 100 of FIG. 1 are depicted, according to some embodiments. As shown, the laser diode 3 and digital camera 7 are positioned within stem 2. Also shown, a laser focusing lens 4 can be positioned closer to the distal end of the stem 2 as compared to the laser diode 3 and operable to receive the laser light from the laser diode 3 and project and/or create an altered or bent laser light for the conical mirror 5, which is operable to receive the altered or bent laser light from the laser focusing lens 4 and project or create a laser pattern 6. Thus, the laser diode 3 and laser focusing lens 4 can be operable to generate a laser light. It should be understood that the laser focusing lens 4 can be, but is not limited, a plano-convex (PCX) lens, an aspheric lens, a cylinder lens, a laser focusing assembly, a specialty lens, etc. and the laser focusing lens 4 can have different focal lengths, spot sizes, and depths of focus. In some embodiments, the laser focusing lens 4 can be electrically coupled to the digitizing arm to enable the digitizing arm to send commands to adjust (e.g., refocus, recalibrate) the laser focusing lens 4 (e.g., in real-time as the optical scanning attachment 100 is digitizing the surface contour of a volume).

Figure 5:
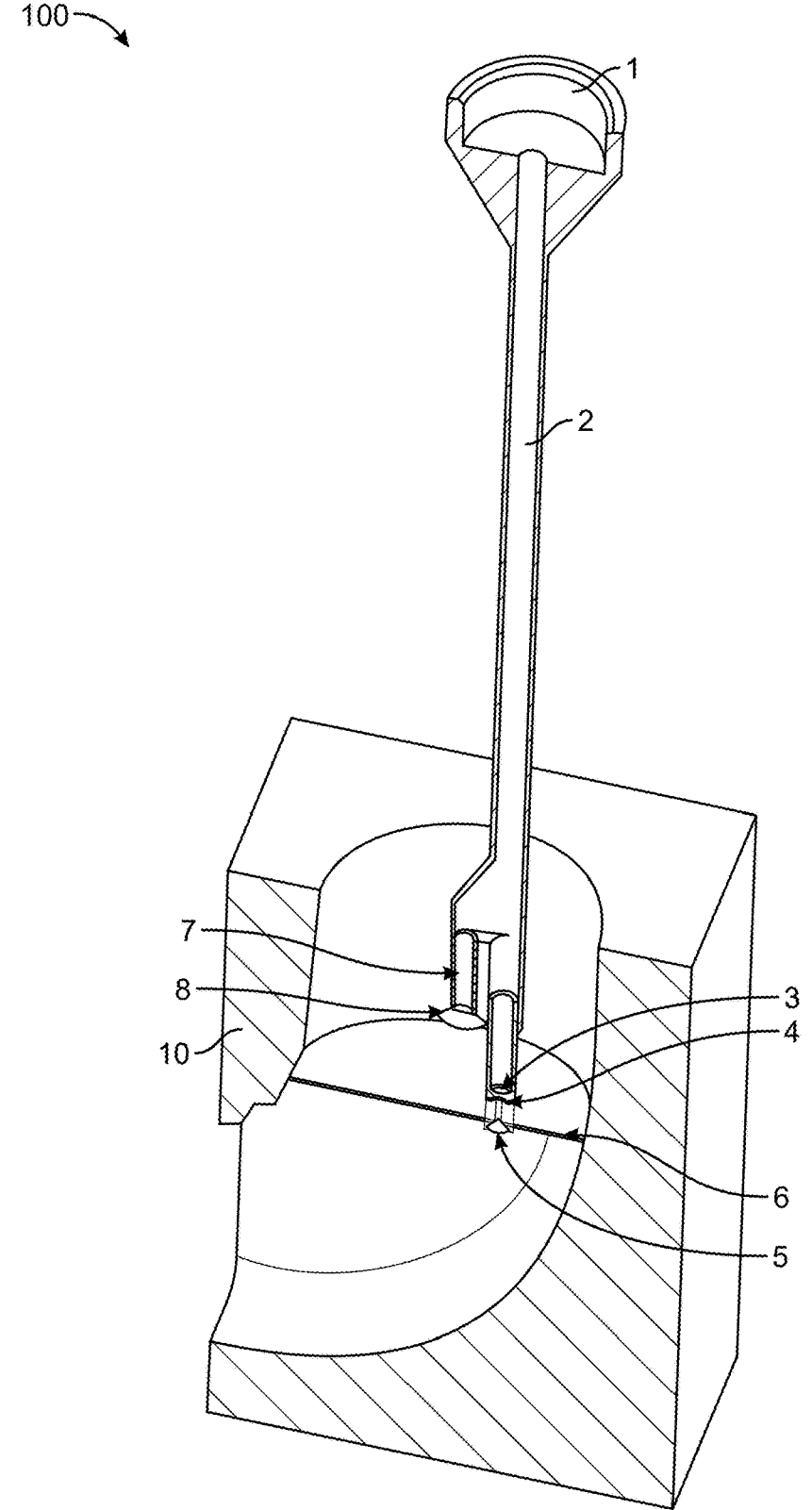
FIG. 5 is a perspective view of an optical scanning attachment of FIG. 1 in operation, according to some embodiments.

Referring now to FIG. 5, a perspective view of an optical scanning attachment 100 of FIG. 1 in operation is depicted, according to some embodiments. As shown, the laser pattern 6 is projected or provided on the surface of the part to be digitized 10 (e.g., partially closed volume).

Figure 6:
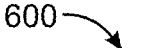
FIG. 6 is a section view of an optical scanning attachment with conical projection, according to some embodiments.
Figure 6:
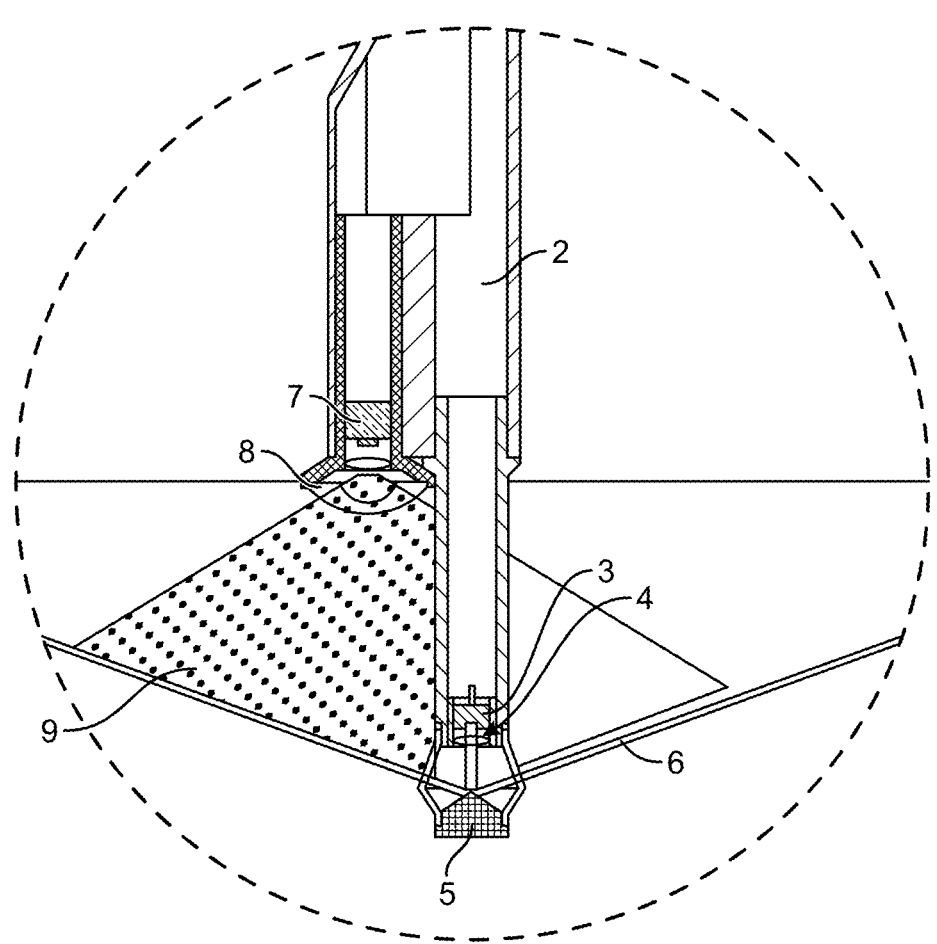

Referring now to FIG. 6, a section view of an optical scanning attachment 600 with conical projection is depicted, according to some embodiments. The optical scanning attachment 600 resemble similar features and functionality of optical scanning attachment 100, described in detail with reference to FIG. 1. However, the optical scanning attachment 600 (e.g., in particular the conical mirror) is shown to project a laser pattern 6 that is conical.

Figure 7:
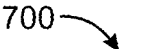
FIG. 7 is a section view of an optical scanning attachment with a contact sphere, according to some embodiments.

Referring now to FIG. 7, a section view of an optical scanning attachment 700 with a contact sphere is depicted, according to some embodiments. The optical scanning attachment 700 resemble similar features and functionality of optical scanning attachment 100, described in detail with reference to FIG. 1. However, the optical scanning attachment 700 is shown to include a contact sphere 11. The contact sphere 11 can be fixedly coupled to the distal end of the stem 2 and/or conical mirror 5 (e.g., if positioned outside and at the distal end of stem 2). In some embodiment, the user can press a button on the digitizer to capture a single point, knowing that the contact sphere 11 is in contact with the surface to be digitized at the desired capture location, such as on a flat surface, or on the surface of a cylinder, etc. In various embodiments, in the event of the contact sphere 11 detecting contact by some kind of force sensing switch a point can be automatically collected. In particular, the contact sphere 11 could communicably couple with the digitizer and transmit such points. Multiple points can also be collected by holding a trigger button of the digitizer and dragging the contact sphere 11 across the surface to be digitized. In general, contact spheres 11 are typically made out of a hard abrasion resistant material, such as tungsten carbide, ruby, or zirconia. Furthermore, the contact sphere can be permanently attached to the distal end of the stem 2 by some kind of adhesive or threaded connection or could be integrated into the conical mirror 5. A secondary purpose for using the contact sphere 11 is to protect the optical elements at the end of the stem from damage. A contact sphere 11 used on a digitizer for contact probing is typically connected to a narrow tungsten carbide stem that then tapers to a larger diameter and attaches to the digitizer end (i.e., a sphere with a hole in it that the stem is cemented into, where the narrow stem facilitates reaching the sphere around edges from different angles to maintain spherical contact with the intended surface).

Figure 8:
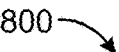
FIG. 8 is a perspective view of an optical scanning attachment with a flat mirror and line lens, according to some embodiments.

Referring now to FIG. 8 is a perspective view of an optical scanning attachment 800 with a flat mirror and line lens is depicted, according to some embodiments. The optical scanning attachment 800 resemble similar features and functionality of optical scanning attachment 100, described in detail with reference to FIG. 1. However, the optical scanning attachment 800 is shown to project a laser pattern 6 that is flat based on the line lens 13 and flat mirror 14 shown in FIG. 9.

Figure 9:
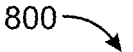
FIG. 9 is a section view of an optical scanning attachment of FIG. 8 with a flat mirror and line lens, according to some embodiments.
Figure 9:
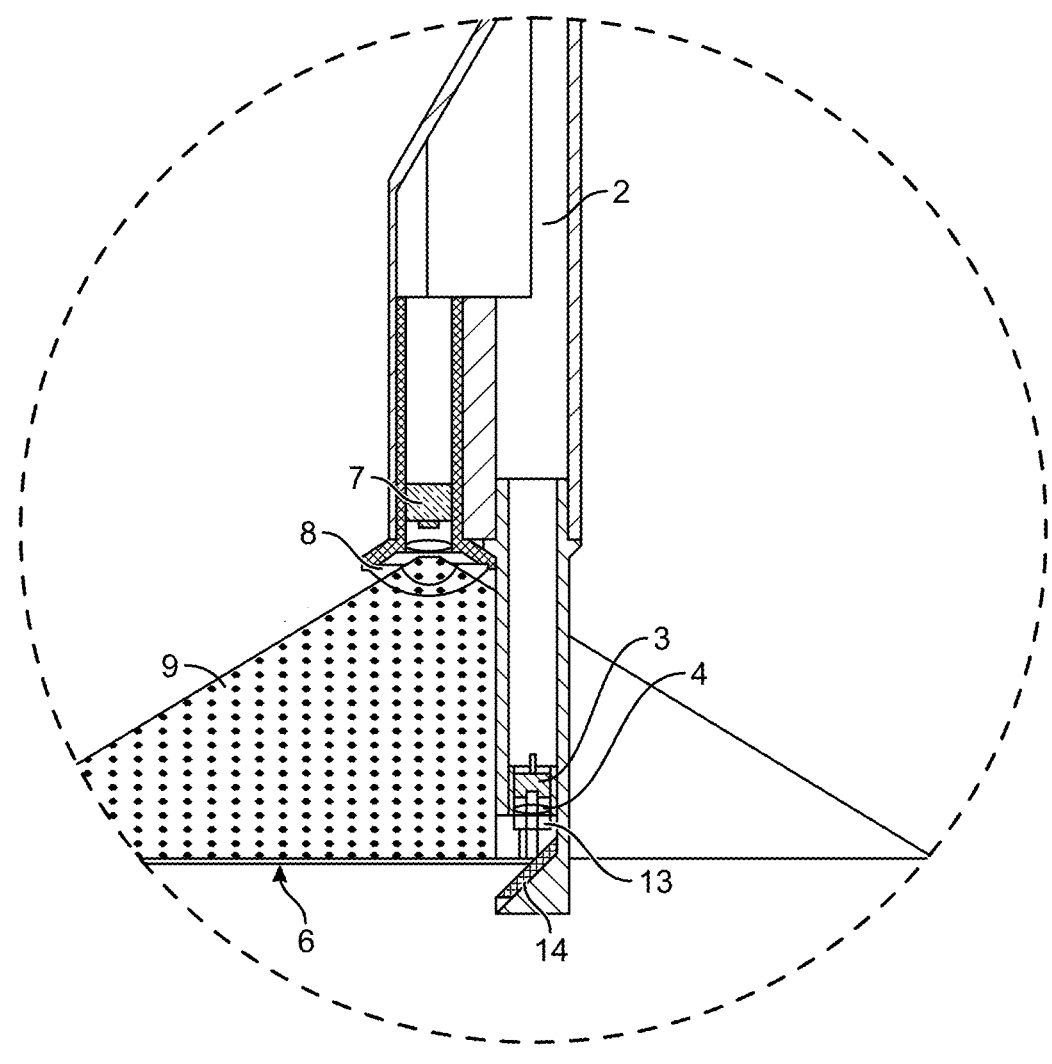

Referring now to FIG. 9 is a section view of an optical scanning attachment 800 OF FIG. 8 with a flat mirror and line lens is depicted, according to some embodiments. As shown, the line lens 13 can be positioned closer to the distal end of the stem 2 as compared to the laser diode 3 and laser focusing lens 4 and operable to receive the laser light from the laser focusing lens 4. In some embodiments, the line lens 13 can be receive a point light source, such as a collimated laser beam, and spreads it out into a fan shape at some included angle. That is, it can receive a 1 dimensional beam and spreads it into 2 dimensions. The line lens 13, and flat mirror 14 can work together to produce the light pattern, taking the place of the conical mirror 5 in FIGS. 1-7. In some embodiments, the line lens 13 can be electrically coupled to the digitizing arm to enable the digitizing arm to send commands to adjust (e.g., refocus, recalibrate) the line lens 13 (e.g., in real-time as the optical scanning attachment 100 is digitizing the surface of a volume). It should be understood that the line lens 13 can be, but is not limited, a laser line generator, stretching a narrow laser beam into a uniformly illuminated straight line. Also shown, the flat mirror 14 (generally referred to herein as "an optical element") can be positioned outside and at the distal end of stem 2. The flat mirror 14 can be operable to receive the laser light from laser diode 3 and create (e.g., by reflecting or refracting the laser light) a laser pattern 6 (e.g., planar fan shape, conical shape, etc.).

Figure 10:
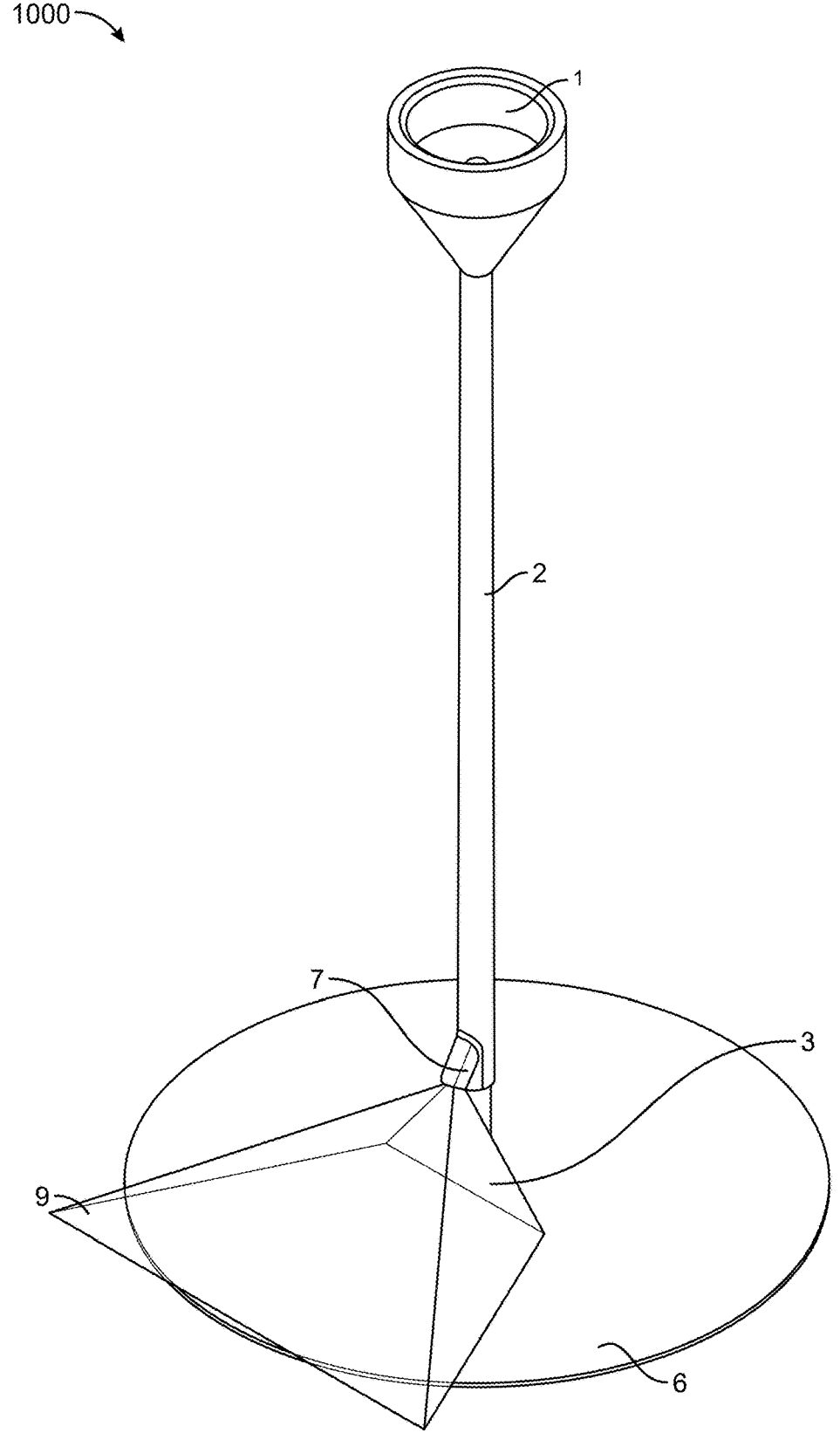
FIG. 10 is a perspective view of an optical scanning attachment with an off-axis camera, according to some embodiments.

Referring now to FIG. 10, a perspective view of an optical scanning attachment 1000 with an off-axis camera is depicted, according to some embodiments. The optical scanning attachment 1000 resemble similar features and functionality of optical scanning attachment 100, described in detail with reference to FIG. 1. However, the optical scanning attachment 800 is shown to include an off-axis or non-planar digital camera 7.

Figure 11:
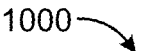
FIG. 11 is a section view of an optical scanning attachment of FIG. 10 with an off-axis camera, according to some embodiments.

Referring now to FIG. 11, a section view of an optical scanning attachment 1000 of FIG. 10 with an off-axis camera is depicted, according to some embodiments. As shown, the digital camera 7 can be positioned off-axis or non-planar to stem 2 and can include a camera focusing lens 15 (e.g., optical element), which determines the camera FOV 9. As shown, the camera focusing lens 15 can be positioned (e.g., mounted) inside, around, and/or at or close to the distal end of the stem 2 (e.g., closer to the distal end than the proximal end). In some embodiments, the camera FOV 9 is determined based on the camera focusing lens 15. In some embodiments, the camera focusing lens 15 can be electrically coupled to the digital camera 7 to enable the digital camera 7 to send commands to adjust (e.g., refocus, recalibrate) the camera focusing lens 15 (e.g., in real-time as the optical scanning attachment 100 is digitizing the surface of a volume).

Figure 12:
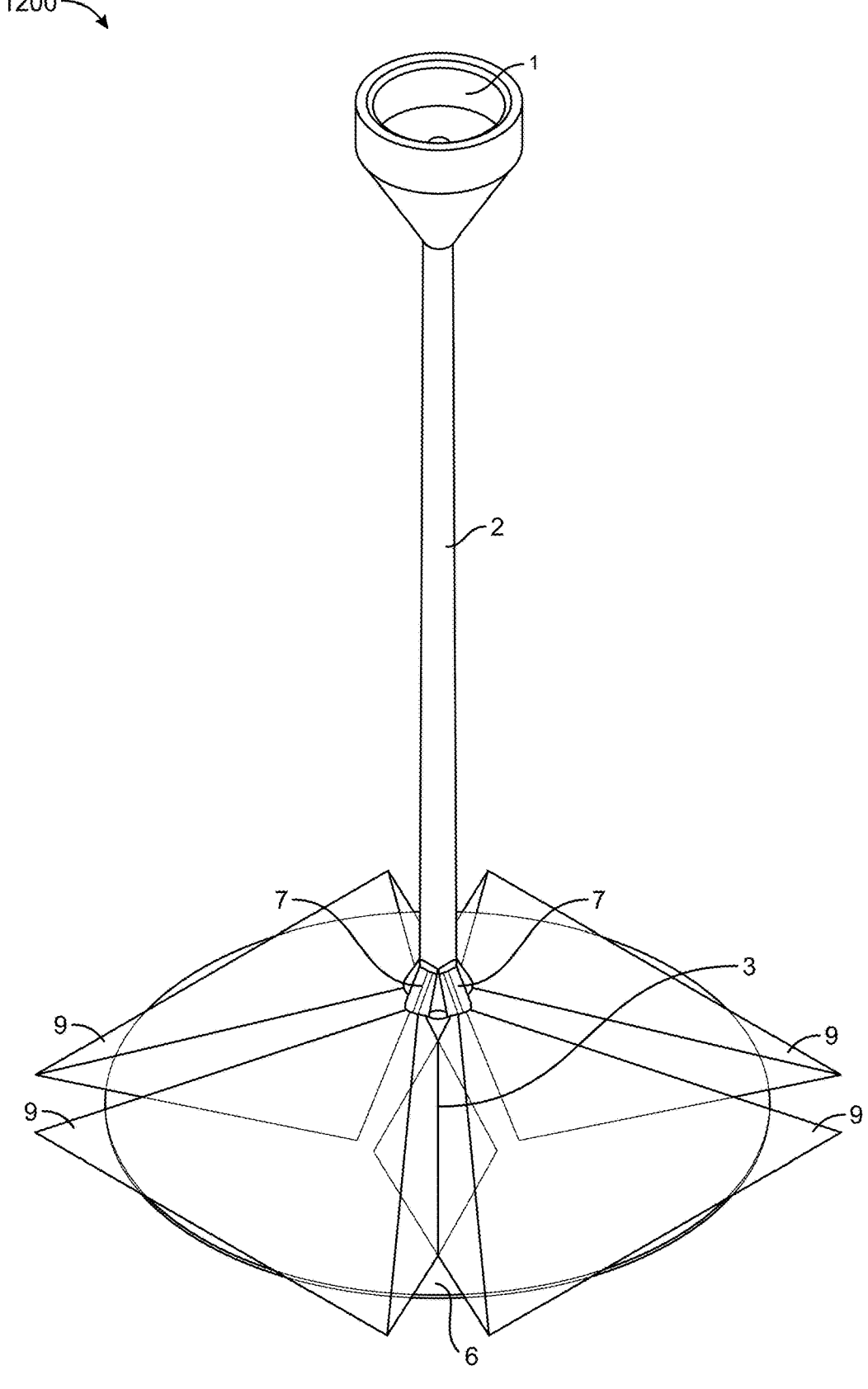
FIG. 12 is a perspective view of an optical scanning attachment with a plurality of cameras, according to some embodiments.

Referring now to FIG. 12, a perspective view of an optical scanning attachment 1200 with a plurality of cameras is depicted, according to some embodiments. The optical scanning attachment 1200 resemble similar features and functionality of optical scanning attachment 100, described in detail with reference to FIG. 1. However, the optical scanning attachment 1200 is shown to include a plurality of off-axis or non-planar digital cameras 7. Each digital camera 7 can be positioned and/or mounted within the stem 2 or outside, around, and/or at or close to the distal end of the stem 2. In some embodiments, each digital camera 7 can include a camera focusing lens 15 that can capture the cameras FOV 9 (4 camera FOVs are shown). For example, the viewing angle of the digital cameras 7 can be at a 90 degree viewing angle with respect to the non-planar off-axis of stem 2 in an outward direction of stem 2 (e.g., 45 degrees towards the distal end of stem 2). In another example, the viewing angle of the digital cameras 7 can be at a 130 degree viewing angle with respect to the non-planar off-axis of stem 2 in an outward direction of stem 2 (e.g., 45 degrees towards the distal end of stem 2). In various embodiments, while 4 digital cameras are shown, more or less digital cameras 7 can be used. Each digital camera 7 can be electrically coupled to the digitizing arm via one or more cables that provides power to each digital camera 7.

In some embodiments, each digital camera 7 can be powered using a battery (e.g., stored within stem 2). In various embodiments, each digital camera 7 can also be communicably coupled to the digitizing arm via a wired or wireless connection. Each digital camera 7 can be configured to receive an image of the laser pattern 6 (or portion of laser pattern 6) on the surface of a volume. In particular, the digital camera 7 can be configured to receive and transmit images from camera focusing les 15 (of FIG. 12) to the processing circuit of the digitizing arm for analysis and/or processing. The images (laser pattern 6 projected on the surface of the volume) can be collected, captured, or received based on the camera FOV 9 of each digital camera 7. The processing circuit of the digitizing arm can be configured to receive the images and aggregate, interpolate, merge, photomontage, compositing, etc. (collectively referred to herein as analyzing and/or processing) to combine visual elements (e.g., the surface of the volume) from multiple images to form a single image (e.g., composite image). In various embodiments, each digital camera 7 can be mounted at the aperture of the camera focusing lens 15 or can be mounted elsewhere within the stem 2 or in the digitizing arm such that the camera focusing lens 15 can be connected to each respective digital camera 7 via a wired or wireless connection (e.g., Wi-Fi, Bluetooth, optical fiber, ethernet cable, etc.).

Figure 13:
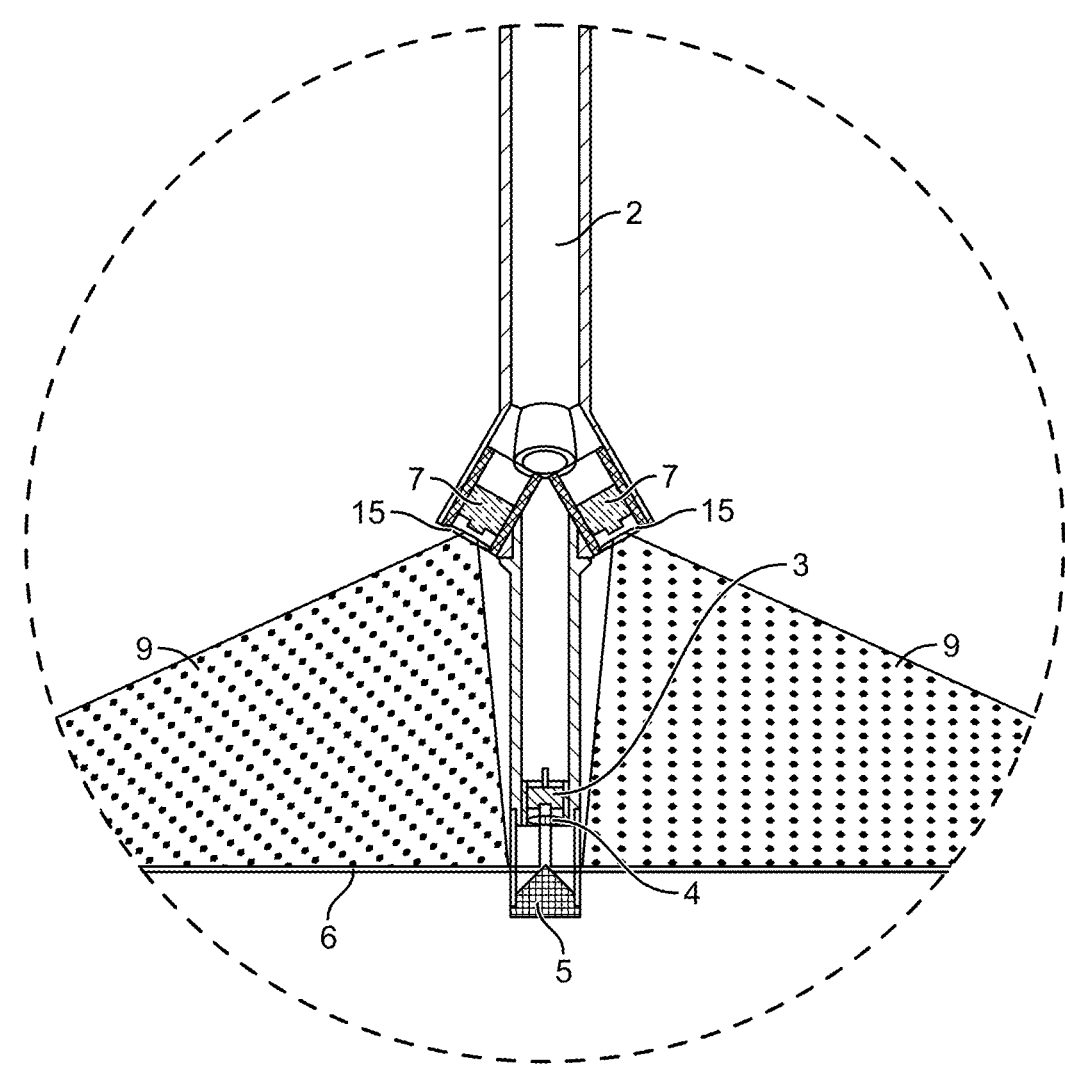
FIG. 13 is a section view of an optical scanning attachment of FIG. 13 with a plurality of cameras, according to some embodiments.

Referring now to FIG. 13, a section view of an optical scanning attachment 1200 of FIG. 12 with a plurality of cameras is depicted, according to some embodiments. As shown, each digital camera 7 can be positioned off-axis or non-planar to stem 2 and can include a respective camera focusing lens 15 (e.g., optical element), which determines the respective camera FOV 9. As shown, each camera focusing lens 15 can be positioned (e.g., mounted) inside, around, and/or at or close to the distal end of the stem 2. In some embodiments, the camera FOV 9 is determined based on the camera focusing lens 15. In some embodiments, the camera focusing lens 15 can be electrically coupled to the digital camera 7 to enable the digital camera 7 to send commands to adjust (e.g., refocus, recalibrate) the camera focusing lens 15 (e.g., in real-time as the optical scanning attachment 100 is digitizing the surface of a volume).

Figure 14:
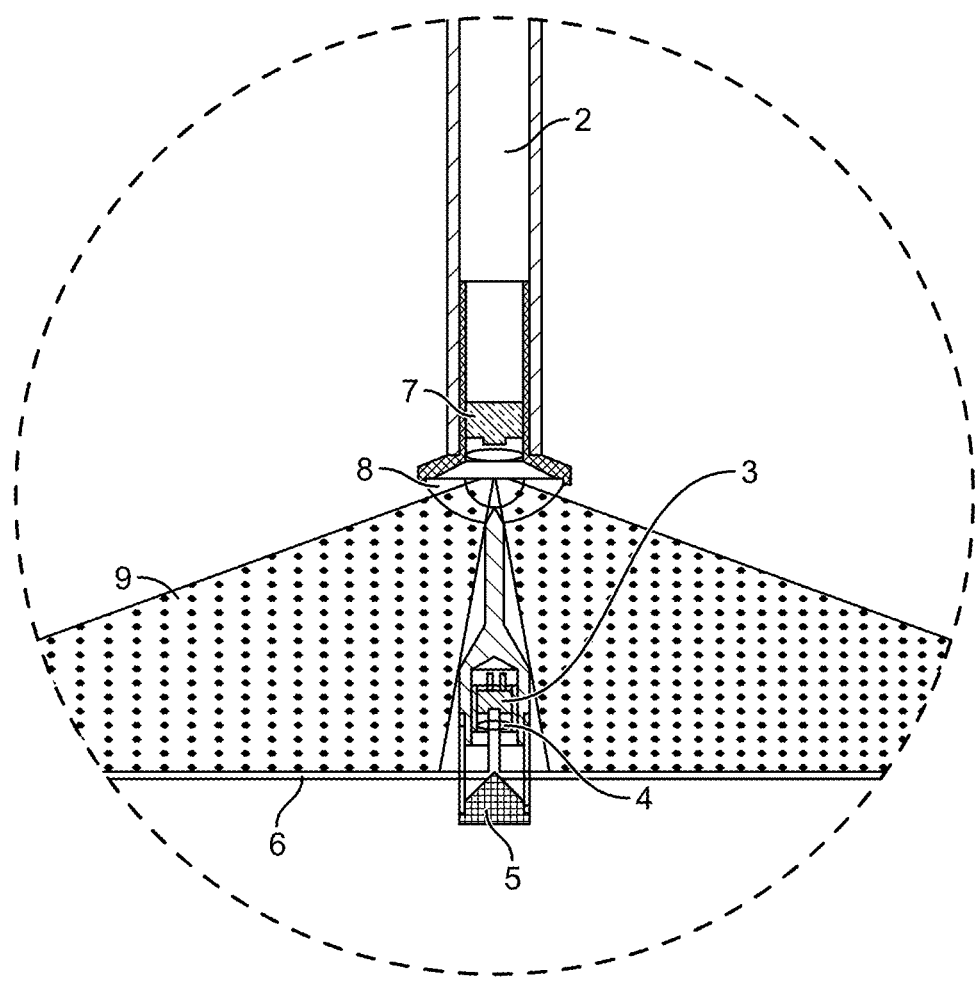
FIG. 14 is a section view of an optical scanning attachment with a coaxial camera, according to some embodiments.

Referring now to FIG. 14, a section view of an optical scanning attachment 1400 with a coaxial camera is depicted, according to some embodiments. The optical scanning attachment 1400 resemble similar features and functionality of optical scanning attachment 100, described in detail with reference to FIG. 1. However, the optical scanning attachment 1400 is shown to include a coaxial camera as digital camera 7.

Figure 15:
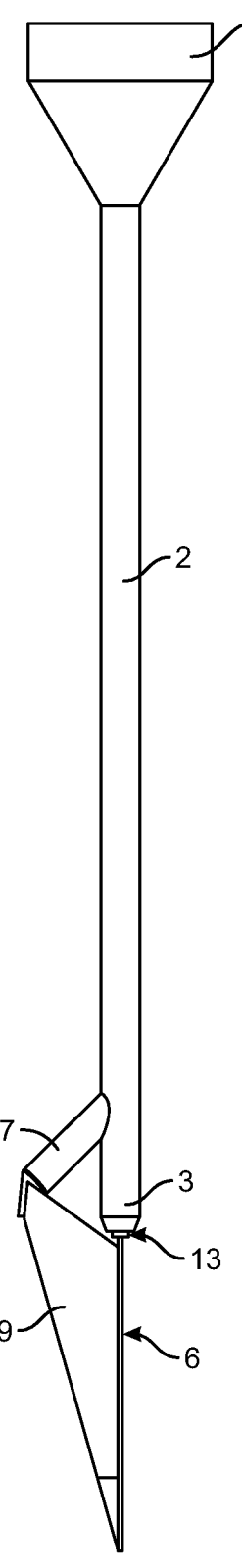
FIG. 15 is a perspective view of an optical scanning attachment with a forward line laser, according to some embodiments.

Referring now to FIG. 15, a perspective view of an optical scanning attachment 1500 with a forward line laser is depicted, according to some embodiments. The optical scanning attachment 1500 resemble similar features and functionality of optical scanning attachment 100, described in detail with reference to FIG. 1. However, the optical scanning attachment 1500 is shown to include a configuration to digitize a surface at the bottom of a cavity with a narrow opening (e.g., area of the object farthest away from the opening where the optical scanning attachment 1500 enters). As shown above, other embodiments with the laser directed perpendicular to the stem can be directed to digitizing the walls of the cavity. It should be understood, both the optical scanning attachment 1500 and the other embodiments herein can be used interchangeable to digitize entire cavities and objects.

Figure 16:
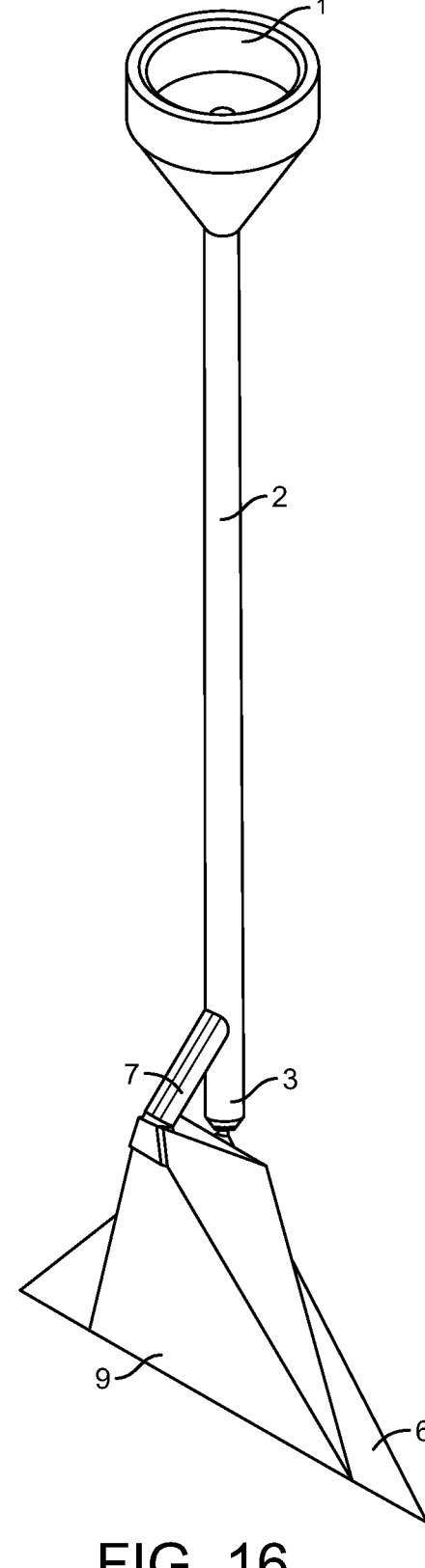
FIG. 16 is an isometric perspective view of an optical scanning attachment of FIG. 15 with a forward line laser, according to some embodiments.

Referring now to FIG. 16, an isometric perspective view of an optical scanning attachment 1500 of FIG. 15 with a forward line laser is depicted, according to some embodiments.

Figure 17:
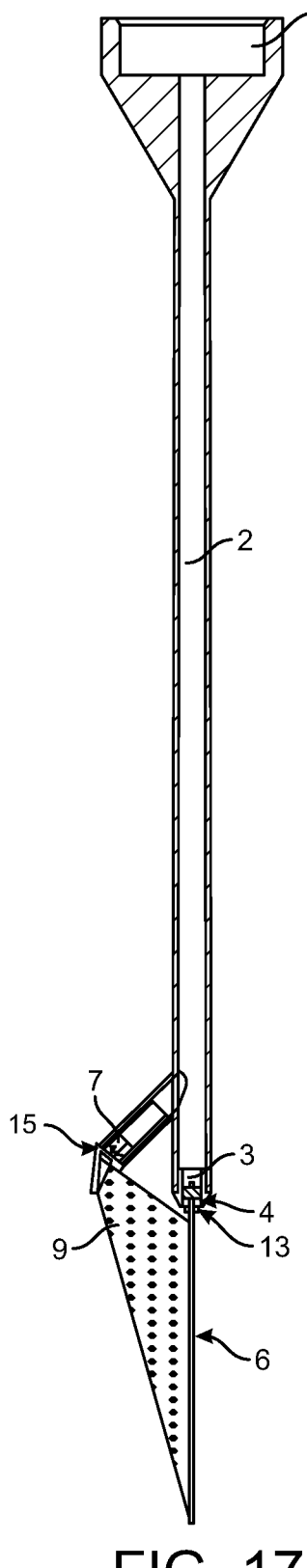
FIG. 17 is a section view of an optical scanning attachment of FIG. 15 with a forward line laser, according to some embodiments.

Referring now to FIG. 17, a section view of an optical scanning attachment 1500 of FIG. 15 with a forward line laser is depicted, according to some embodiments.

Figure 18:
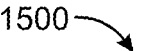
FIG. 18 is a section view of an optical scanning attachment of FIG. 15 with a forward line laser, according to some embodiments.

Referring now to FIG. 18, a section view of an optical scanning attachment 1500 of FIG. 15 with a forward line laser is depicted, according to some embodiments.

Figure 20:
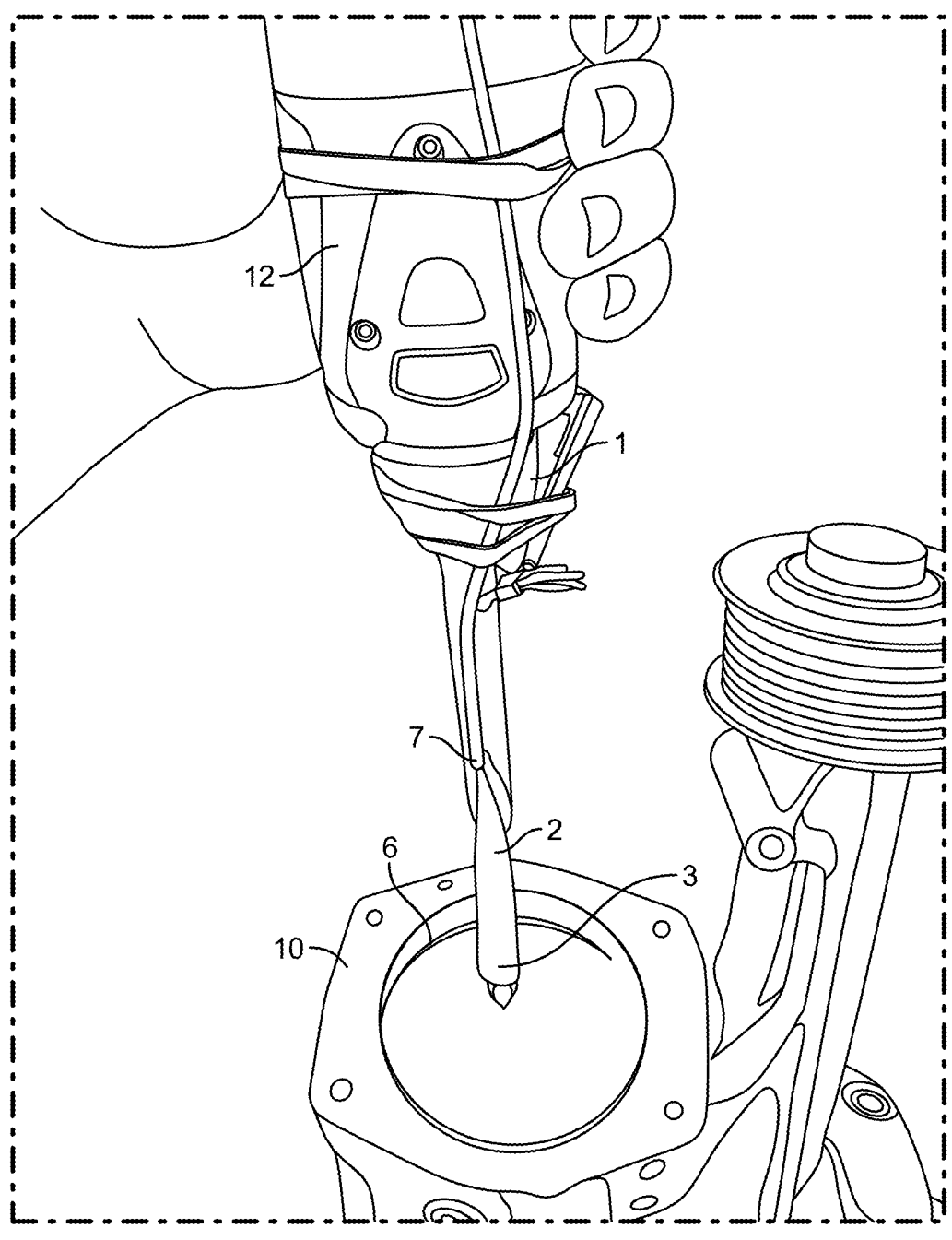
Figure 21:
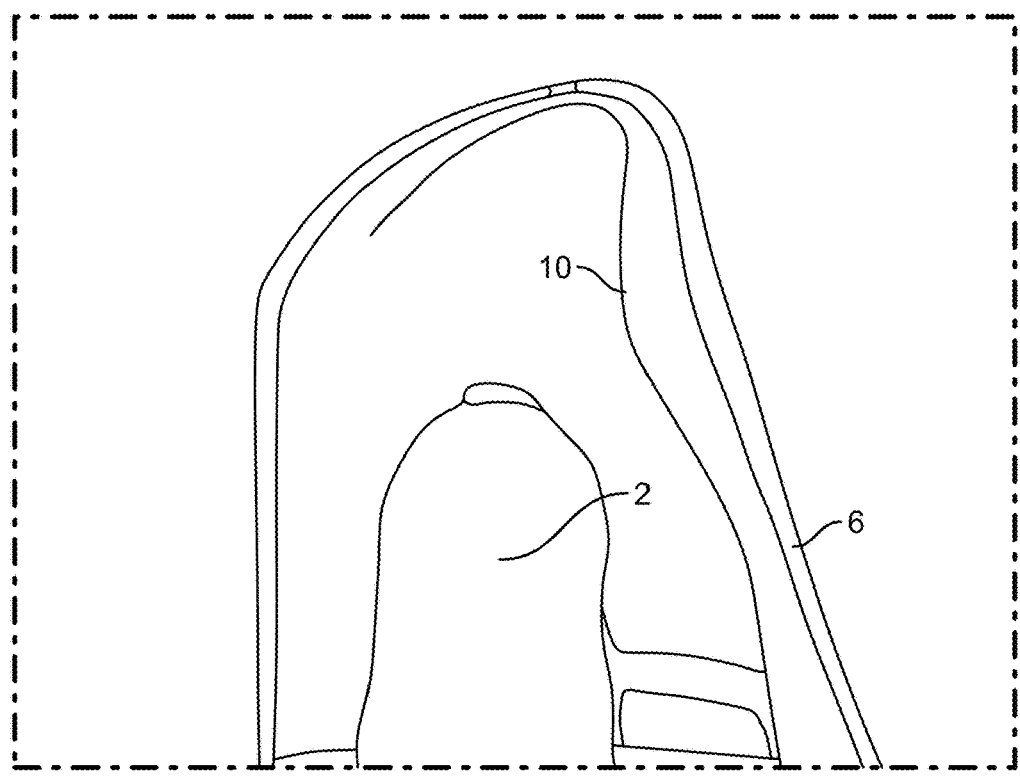
Figure 21:
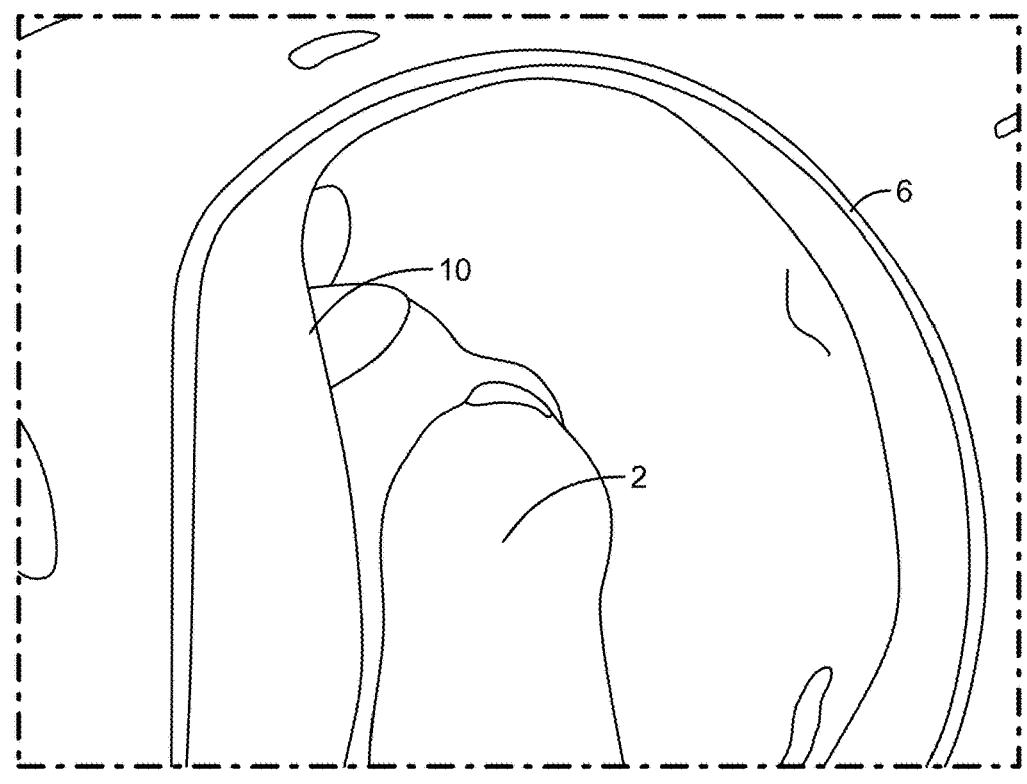

Referring now to FIGS. 19-21, an example implementation of an optical scanning attachment 100 of FIG. 1 within an environment, according to some embodiments. The coordinate measurement machine (CMM) 12 is shown (sometimes referred to herein as "a digitizer" or "a digitizing arm" hereafter referred to as "digitizer 12") and can include one or more processing circuits configured to transmit and receive data from the optical scanning attachment 100 (e.g., digital camera 7, laser diode 3, lens, etc.). In general, the one or more processing circuits can include a microprocessor, an application specific integrated circuit (ASIC), a field-programmable gate array (FPGA), and so on, or combinations thereof. A memory can include, but is not limited to, electronic, optical, magnetic, or any other storage or transmission device capable of providing processor with program instructions. Instructions can include code from any suitable computer programming language. In some embodiments, the optical scanning attachment 100 can be configured to digitize (e.g., part to be digitized 10) surfaces of a volume, such as a partially closed volume shown with reference to FIG. 21. For example, and as shown, the laser pattern 6 (flat) can be projected onto the part to be digitized 10 and the digital camera 7 (or cameras) can be configured to receive a plurality of images of the laser pattern 6 on the surface contour of the partially closed volume.

Figure 22:
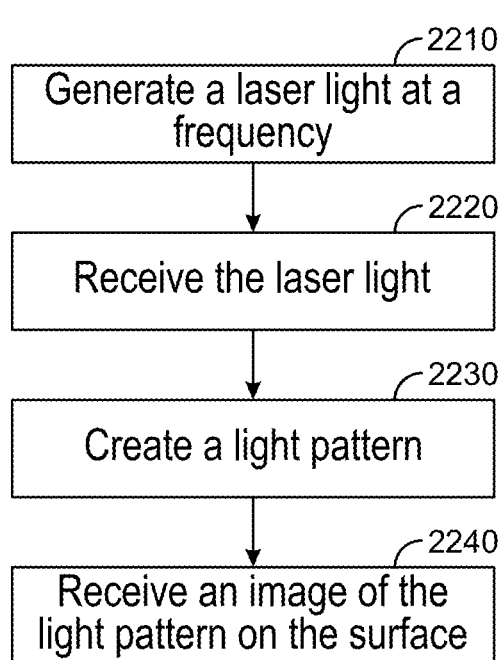
FIG. 22 is a block diagram of a method for scanning a surface of a partially closed volume, according to some embodiments.

Referring now to FIG. 22, a block diagram of a method 2200 for scanning a surface of a partially closed volume, according to some embodiments. Optical scanning attachment 100 can be configured to perform method 2200.

In broad overview of method 2200, at block 2210, the optical scanning attachment (e.g., optical scanning attachment 100 in FIG. 1) can generate a laser light at a frequency. At block 2220, the optical scanning attachment can receive the laser light. At block 2230, the optical scanning attachment can create a light pattern 2230. At block 2240, the optical scanning attachment can receive an image of the light pattern on the surface. Additional, fewer, or different operations may be performed depending on the particular arrangement. In some embodiments, some or all operations of method 2200 may be performed by one or more processors executing on one or more computing devices, systems, or servers. In various embodiments, each operation may be re-ordered, added, removed, or repeated.

Referring now to FIG. 22 in more detail at block 2210, the optical scanning attachment can generate, by at least one laser of an optical scanning attachment, a laser light at a frequency. This frequency allows the laser light to be specifically tuned for optimal performance, considering factors such as the surface material being scanned and environmental conditions. The generated laser light then passes through an optical element, such as a conical mirror, which in turn produces a distinct laser pattern. This pattern is projected onto the surface or object in question, aiding in its digital representation. Depending on the embodiment, the pattern could be linear, grid-like, or even more complex in nature, designed to maximize accuracy in the subsequent digitization process.

Referring now to FIG. 22 in more detail at block 2220, the optical scanning attachment can receive, by at least one optical element of the optical scanning attachment, the laser light. This received laser light can then be directed towards a surface or volume to be digitized. The laser light, upon generation, provides precise navigation in order to be effectively directed towards the intended surface or volume set for digitization. The light is ensured to reach its intended target and it also maintains the integrity and clarity of the light itself. To achieve this, the optical element is designed to allow the maximum amount of light to be received without loss or dispersion. This functionality ensures that the intensity and focus of the laser light remain consistent, which, in turn, results in an accurate scanning process.

Referring now to FIG. 22 in more detail at block 2230, the optical scanning attachment can create, by the at least one optical element, a light pattern. The optical element, such as the conical mirror or a lens, can manipulate the laser light, either by refracting or reflecting it, to form the laser pattern. This pattern is then projected onto the target surface or volume. The specificity of the pattern's projection is influenced by the shape, size, and orientation of the optical element, thus ensuring precision in capturing the details of the scanned object. Furthermore, the distance between the optical scanning attachment and the surface, as well as the angle of incidence, can be dynamically adjusted, ensuring optimal light distribution and achieving maximum clarity in the pattern projection. Depending on the nature of the optical element, such as whether it's a conical mirror, a lens, or another sophisticated device, the laser light undergoes specific manipulations. Through the principles of optics, such as refraction in the case of lenses or reflection in the case of mirrors, the laser light is transformed into a defined laser pattern.

Referring now to FIG. 22 in more detail at block 2240, the one optical scanning attachment can receive, by at least one camera of the optical scanning attachment, an image of the light pattern on the surface of the partially closed volume. Once the laser pattern illuminates the target surface or volume, the digital camera can capture this illuminated image. The captured image is then sent through the camera's Field of View (FOV) and, with the assistance of the wide-angle lens, it ensures a comprehensive capture of the surface or volume details. This detailed image data is transmitted, either wirelessly or via a connected cable, to the processing circuit of the digitizing arm. Advanced algorithms within the processing circuit interpret this data, converting the image of the laser pattern on the surface into a detailed point cloud. This point cloud representation provides an accurate three-dimensional rendering of the scanned object, suitable for a wide range of applications including, but not limited to, industrial design, quality assurance, and digital archiving. In some embodiments, the camera, equipped with specialized lenses and sensors, captures the reflected light pattern from the surface. This reflected pattern, which may change based on the topography of the scanned surface, provides valuable data regarding the surface's shape and features. The variations in the pattern, such as distortions or displacements, indicate the geometry of the underlying surface. The camera's high resolution and sensitivity ensure every change in the light pattern is registered, leading to a highly accurate representation in the digitized output.

In some embodiments, the optical scanning attachment includes an elongated member having a proximal and a distal end, wherein the proximal end is positioned closer to a digitizing arm as compared to the distal end, wherein the at least one laser is positioned so that external laser light emanates adjacent the distal end of the elongated member. In these embodiments, this design allows for precision in directing the laser light towards the intended scanning surface or volume. The elongated member acts as a conduit, ensuring that the laser light travels in a straight and controlled path. Its distinction between the proximal and distal ends aids in the effective positioning of the optical scanning attachment relative to the object being scanned. The strategic placement of the laser, particularly adjacent to the distal end, facilitates a focused and unobstructed emission of the laser light onto the target, minimizing potential interference or dispersion. This design enhances the accuracy and efficiency of the scanning process, making it suitable for detailed and intricate digitization tasks.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the FIGURES show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. An optical scanning attachment coupled to a digitizing arm for use in a three-dimensional (3D) scan of a surface of a partially closed volume, the optical scanning attachment comprising:

at least one laser operable to generate a laser light at a frequency;

at least one optical element operable to receive the laser light and generate a light pattern, wherein the at least one optical element is configured to provide the light pattern on the surface of the partially closed volume, and wherein an image of the light pattern on the surface of the partially closed volume comprises surface contours;

at least one camera comprising a lens and configured to receive the image of the light pattern on the surface of the partially closed volume; and an elongated member having a proximal and a distal end, wherein the proximal end is positioned closer to the digitizing arm as compared to the distal end, wherein the at least one laser is positioned so that external laser light emanates adjacent the distal end of the elongated member, and wherein the at least one camera is positioned adjacent to the distal end of the elongated member.

2. The optical scanning attachment of claim 1, wherein at least a portion of the lens is positioned outside the elongated member.

3. The optical scanning attachment of claim 1, wherein a portion of the lens positioned outside the elongated member is co-planar to the elongated member.

4. The optical scanning attachment of claim 1, wherein a portion of the lens positioned outside the elongated member is non-planar to the elongated member.

5. The optical scanning attachment of claim 1, wherein at least a portion of the at least one optical element is positioned outside the elongated member.

6. The optical scanning attachment of claim 1, wherein the image of the light pattern on the surface of the partially closed volume is transmitted, via a fiber optic cable, to the digitizing arm for processing, and wherein the light pattern is conical or flat.

7. The optical scanning attachment of claim 1, wherein the lens is at least one of a fisheye lens or a wide angle lens, and wherein the at least one optical element is at least one of a conical mirror or prism.

8. The optical scanning attachment of claim 1, further comprising:

an interface positioned at the proximal end and configured to fixedly couple to the digitizing arm.

9. The optical scanning attachment of claim 1, wherein the laser light is generated by a plurality of lasers, wherein the laser light is aggregate of the plurality of lasers.

10. The optical scanning attachment of claim 1, wherein the at least one camera comprises at least one of a plurality of cameras or a plurality of lenses.

11. The optical scanning attachment of claim 10, wherein the plurality of cameras comprises at least four cameras each configured to receive a different image of the light pattern on the surface of the partially closed volume.

12. The optical scanning attachment of claim 1, wherein the light pattern on the surface of the partially closed volume is a conical projection, and wherein accuracy of the at least one camera is based on at least one or more of attributes selected from the group consisting of a megapixel size of the at least one camera, a size of a camera field of view of the at least one camera, an aspect ratio of the at least one camera, a rated accuracy of the at least one camera, a camera field of view to corners of the at least one camera, an arm tolerance of the digitizing arm, and a type of the at least one camera.

13. The optical scanning attachment of claim 1, further comprising:

a contact sphere fixedly coupled to the distal end of the elongated member.

14. The optical scanning attachment of claim 1, wherein the at least one optical element is a flat mirror and wherein the lens is a line lens.

15. The optical scanning attachment of claim 1, wherein the at least one camera is positioned off-axis to the distal end, and wherein the partially closed volume is at least one of a casting with a core, a welded sheet metal part or assembly, a riveted assembly, a composite structure, or a tube structure.

16. An optical scanning system comprising:

a digitizing arm comprising a processing circuit for processing images;

a digitizing arm interface fixedly coupled to the digitizing arm;

an optical attachment coupled, via the digitizing arm interface, to the digitizing arm for use in a three-dimensional (3D) scan of a surface of a partially closed volume, the optical scanning attachment comprising:

at least one laser operable to generate a laser light at a frequency;

at least one optical element operable to receive the laser light and create a light pattern, wherein the at least one optical element is configured to provide the light pattern on the surface of the partially closed volume, and wherein an image of the light pattern on the surface of the partially closed volume comprises surface contours;

at least one camera comprising a lens and configured to receive the image of the light pattern on the surface of the partially closed volume, and wherein a portion of the lens positioned outside the elongated member is co-planar to the elongated member; and an elongated member having a proximal and a distal end, wherein the proximal end is positioned closer to the digitizing arm as compared to the distal end, wherein the at least one laser is positioned so that external laser light emanates adjacent the distal end of the elongated member, and wherein the at least one camera is positioned adjacent to the distal end of the elongated member.

17. The optical scanning system of claim 16, wherein at least a portion of the at least one optical element is positioned outside the elongated member, and wherein the image of the light pattern on the surface of the partially closed volume is transmitted, via a fiber optic cable, to the digitizing arm for processing, and wherein the light pattern is conical or flat.

*     *     *     *     *